US010592149B1

(12) United States Patent
Jenkins et al.

(10) Patent No.: US 10,592,149 B1
(45) Date of Patent: Mar. 17, 2020

(54) DYNAMIC DE-DUPLICATION METHODOLOGIES FOR EFFICIENT RESOURCE UTILIZATION ON DE-DUPLICATION SYSTEM

(71) Applicant: EMC IP Holding Company LLC, Hopkinton, MA (US)

(72) Inventors: Fani Jenkins, Boulder, CO (US); Srikant Viswanathan, Pune (IN); Yamini Allu, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 335 days.

(21) Appl. No.: 15/727,363

(22) Filed: Oct. 6, 2017

(51) Int. Cl.
*G06F 3/06* (2006.01)
*G06F 16/174* (2019.01)
*G06F 11/14* (2006.01)

(52) U.S. Cl.
CPC .......... *G06F 3/0641* (2013.01); *G06F 3/0608* (2013.01); *G06F 3/0611* (2013.01); *G06F 11/1453* (2013.01); *G06F 16/1748* (2019.01); *G06F 16/1752* (2019.01); *G06F 16/1756* (2019.01)

(58) Field of Classification Search
CPC .. G06F 11/1453; G06F 3/0608; G06F 3/0641; G06F 3/0611; G06F 16/1748; G06F 16/1752; G06F 16/1756
See application file for complete search history.

(56) References Cited

U.S. PATENT DOCUMENTS

| 9,189,414 | B1* | 11/2015 | Shim ....................... G06F 12/08 |
| 2011/0276781 | A1* | 11/2011 | Sengupta ............ G06F 12/0862 711/216 |
| 2013/0212074 | A1* | 8/2013 | Romanski ........... G06F 12/0253 707/692 |
| 2016/0077924 | A1* | 3/2016 | Todd .................... G06F 11/1435 707/692 |
| 2016/0140052 | A1* | 5/2016 | Waldspurger ....... G06F 12/0893 711/129 |

\* cited by examiner

*Primary Examiner* — William Spieler
(74) *Attorney, Agent, or Firm* — Womble Bond Dickinson (US) LLP (57) ABSTRACT

Embodiments are described for reducing memory usage and disk I/O's for reading and writing streams in a deduplication storage system. Generations of backups of a stream can be tracked for the stream. In the first generation (first backup), stream data is ingested, segmented, and written to disk without looking up a fingerprint of each segment, to save disk I/O's and memory. After the first generation, an amount of stream data processed is tracked, and at dynamically tunable increments of data processed, a fingerprint index lookup is performed to disk. The fingerprint index is read into memory and subsequent fingerprint lookups are preformed to cache, until a next dynamically tunable fingerprint lookup to disk. The dynamically tunable increment of processed data can be randomly reset.

24 Claims, 8 Drawing Sheets

DYNAMIC DE-DUPLICATION METHODOLOGIES FOR EFFICIENT RESOURCE UTILIZATION ON DE-DUPLICATION SYSTEM

TECHNICAL FIELD

This disclosure relates to the field of efficient resource utilization in a de-duplication storage system.

BACKGROUND

A deduplicating storage file system ("storage appliance") can efficiently store a large amount of data by removing duplicate data. For example, the first time that a backup is run for a particular data set, the data is stored with little or no de-deduplication. The second, and subsequent times, that a backup is run for a same or similar data set, there is a high degree of redundancy between the first and subsequent backups. Removing this redundancy can save storage space. A de-duplication process includes computing a hash, a digest, or "fingerprint" of a chunk of data to be stored. This fingerprint can be checked against an index of previously stored fingerprints to determine whether a chunk to be stored is a duplicate of a previously stored chunk. Looking up a fingerprint of a chunk in an index requires a read I/O (input/output) to disk to determine whether the chunk exists in storage already. If so, a reference to the previously stored chunk is written to disk, rather than the chunk of data. A read I/O to determine whether a fingerprint is in a fingerprint index on disk is computationally expensive. A read I/O could bring many fingerprints from disk into cache, to reduce disk read I/O's during deduplication. However, during certain times, such as when data is being backed up for the first time, virtually none of the fingerprints will be stored in cache, thus fingerprint lookups in cache provide no benefit and waste memory and processor time. In addition, as the data is backed up additional times, the data will be spread out on disk, and fingerprints may not be in cache at all.

Current methods of reading and writing in a deduplication storage system are inefficient and do not take into account temporal and locality properties of the data stored in a deduplication storage system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, a reference is made to the accompanying drawings in which like references indicate similar elements, and in which is shown by way of illustration, manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Systems and methods of deduplicating a stream of data are described herein. In an embodiment, deduplication can be performed during a backup of the stream of data. A stream of data may have never been backed up before ("generation 0"), prior to a first backup. If so, then the first backup of such a stream will experience little, or no deduplication of data. Such a backup is often termed a "full backup." Generation 0 stream data can be segmented, a fingerprint computed for each segment, and the segment and fingerprint written to segment storage (SS), without having to lookup segment fingerprints from disk or cache. In a backup of the first, subsequent generation of the stream of data, ("generation 1"), the backup may experience a very high deduplication ratio because the subsequent, generation 1, of the stream of data may not have changed much from the previous, generation 0, backup of the stream. Such a backup is often termed an "increment backup." Stream data can be ingested in batches, segmented into portions of approximately 8 kilobytes (KB) average length, and a fingerprint can be generated for each segment. The fingerprint is an identifier of the content of the segment, and can be computed from the contents of a segment. The fingerprint of a segment can be used to identify a potential duplicate of a segment that has been previously stored a segment storage (SS). An index of fingerprints to segments stored in the SS can be generated and stored in the SS with the segments. Systems and methods described herein reduce the amount of memory used by each stream of data and reduce the number of input/output (I/Os) operations used by each stream during the process of backing up, and deduplicating, the stream of data.

In the first embodiment, a method of reducing memory usage and I/Os in a deduplicating backup system includes determining a stream identifier (stream ID) of a stream of data. The stream data can be stored in one or more containers, each comprising, e.g., 4.5 megabytes (MB) of storage space. The method can determine a container identifier (container ID) of the first container into which the stream data has previously been, or will now be stored on segment storage (SS). It can further be determined whether the stream I/O is read or write, and whether the read or write I/O is a random I/O. If the I/O is a random write, in an embodiment, the random write can be processed differently from stream reads and writes, and random reads. The method can further determine a stream generation number for the stream of data, such as generation 0 (first time being backed up, not previously backed up), generation 1 (second time being backed up, one previous backup), or other generation number. When deduplicating segments of a stream, the fingerprint of a segment may be looked up to determine whether it has been previously stored. A fingerprint found in a fingerprint index is termed a "hit." If the fingerprint is not found, it is termed a "miss." If the first segment fingerprint looked up is a hit, then the fingerprint index of all segments present in the container can be brought into SS cache memory with a single read I/O. Subsequent fingerprint index lookups will be directed to the copy of the fingerprint index in the segment storage cache. A ratio of hits to fingerprint lookups is termed an SS cache hit ratio. After reading, segmenting, deduplicating an amount of data termed the, "fingerprint index lookup threshold," the fingerprint index lookup threshold value can be recalculated. In an embodiment, the default value for the fingerprint index lookup threshold is 1 MB. After processing an amount of stream data greater than or equal to the fingerprint index lookup threshold, the next fingerprint lookup can be from disk and can read the fingerprint index into cache again. If a segment fingerprint is found when looked up in the fingerprint index on the segment store, or found in the segment storage cache, then a reference to the segment can be written to segment storage, rather than writing the segment redundantly to segment storage. In an embodiment, a segment tree will be updated with the fingerprint so that multiple files, or segment trees, can refer to the same fingerprint and segment. In addition, a number of fingerprint lookup "hits" can be incremented. If the fingerprint lookup is a "miss," the segment can be written to segment storage, the fingerprint of the segment can be written to the segment storage fingerprint index, and the fingerprint of the segment can be inserted to the fingerprint index in the segment storage cache. In an embodiment, the segment storage cache copy of the fingerprint index can be written to the fingerprint index in segment storage at the end of a batch of writes, rather than separately writing each fingerprint to the fingerprint index in the segment storage. In an embodiment, after a predetermined amount of stream data has been processed, e.g. 100 MB, the fingerprint index lookup threshold value can be recalculated. In an embodiment, if the result of a fingerprint index lookup threshold calculation is that fingerprints should only be looked up in segment store cache, then the fingerprint index lookup threshold value can be randomly reset to, e.g. 1 MB, to rebalance the system.

In a second embodiment, a method of efficiently reading deduplicated data from a segment storage can include determining whether the read I/O (read operation) is a random read I/O or a sequential read I/O, and determining a size of the read operation. A method can determine whether the read operation is random or sequential stream read operation. It can also be determined whether the read is a direct region read from a small portion of storage that can be read directly from disk using metadata identifying the region and a storage container in which the region is stored. If the read is random, and a small region of storage (e.g. 128 KB, or smaller), then the region can be read directly from the container in which the region is stored, after determining the storage container and region ID, by looking up the fingerprint in a fingerprint index, but without loading the fingerprint index into cache Otherwise, the fingerprint index can be read into a cache for use with future segment reads from the same storage container, in the same I/O as the fingerprint lookup operation The segment can then be read from the storage container and returned to a process that requested the segment read operation. If there are more read operations from the same storage container, the reads can be serviced using the copy of the fingerprint index stored in the cache. If there are more reads from a different container, the container identifier can be determined for the segment(s) to be read, and the fingerprint of the first segment can be looked up in the fingerprint index of the different container. During the fingerprint lookup operation, the fingerprint index for the different container can be read into cache to service the additional read operations.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
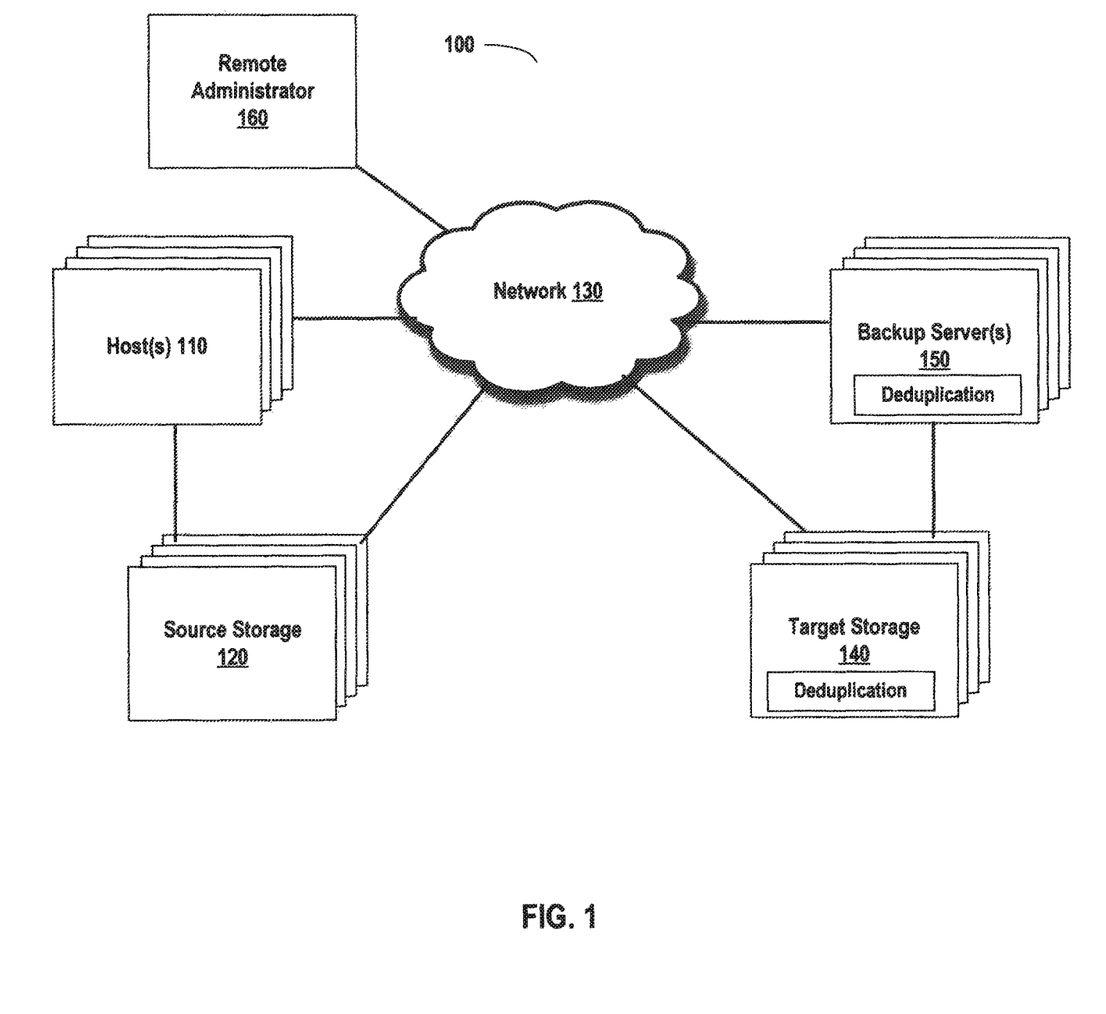
FIG. 1 illustrates, in block diagram form, an overview of an backup and deduplication infrastructure that dynamically adjusts parameters to reduce memory usage and reduce input/output (I/Os) when deduplicating a stream of data, in accordance with some embodiments.

FIG. 1 illustrates, in block diagram form, an overview of an backup and deduplication infrastructure that dynamically adjust parameters to reduce memory usage and reduce input/output (I/Os) when deduplicating a stream of data, in accordance with some embodiments.

A system for backing up, and deduplicating, a stream of data can include one or more host(s) 110, one or more host storage(s) 120, one or more target storage(s) 140, one or more backup server(s) 150, all interconnected via a network 130. Each of target storage(s) 150 and backup server(s) 150 can include a data deduplication system.

Host(s) 110 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 110 may be a primary storage system (e.g., local data center) that provides storage to other local clients, which may periodically back up the content stored therein to a backup storage system (e.g., a disaster recovery site or system), such as backup system 150. Network 130 may be any type of network such as a local area network (LAN), a wide area network (WAN) such as the Internet, a fiber network, a storage network, or a combination thereof, wired or wireless.

Host 110 can backup or restore one or more virtual disks of a virtual machine on the host 110 to or from the backup server 150. Backup server 150 can, in turn, opt to store all or a portion of the backup data of the one or more applications to target storage 140. The virtual disks can map to one or more physical disk drives. The one or more physical disk drives can be located within host 110. In an embodiment, a virtual disk can map to a network attached storage (NAS) across network 130 such as source storage 120 ("storage appliance"). A storage appliance 120 can comprise a large number of disks, such as EMC® VMAX 400K with up to 5,760 hard drives. In an embodiment, one or more storage appliances 120 can form a part of a host 110. In an embodiment, a virtual disk can be a raw virtual disk mapped to a one or more portions of storage. A portion of storage can comprise one or more logical unit numbers (LUNs) of a single physical disk or one or more physical disks in a storage appliance 120. In an embodiment, a raw disk can be configured to use virtual mapping to one or portions of storage, such that the portions of storage can be snapshot before a backup. In an embodiment, a raw virtual disk can be physically mapped to one or more portions of storage.

A backup of a virtual disk on a virtual machine on host 110 can be initiated by a user of the virtual machine on host 110. In an embodiment, a remote administrator 160 can initiate a backup or restore of a virtual disk of a virtual machine on host 110. In an embodiment, scheduled backups can be initiated by backup server 150. Backup server(s) 150 can initiate a backup or restore of virtual disk on a virtual machine on host 110 in accordance with one or more backup policies associated with host 110 or associated with a virtual machine on host 110. In an embodiment, host 110 can be a physical computing system, rather than a virtual machine.

Figure 2:
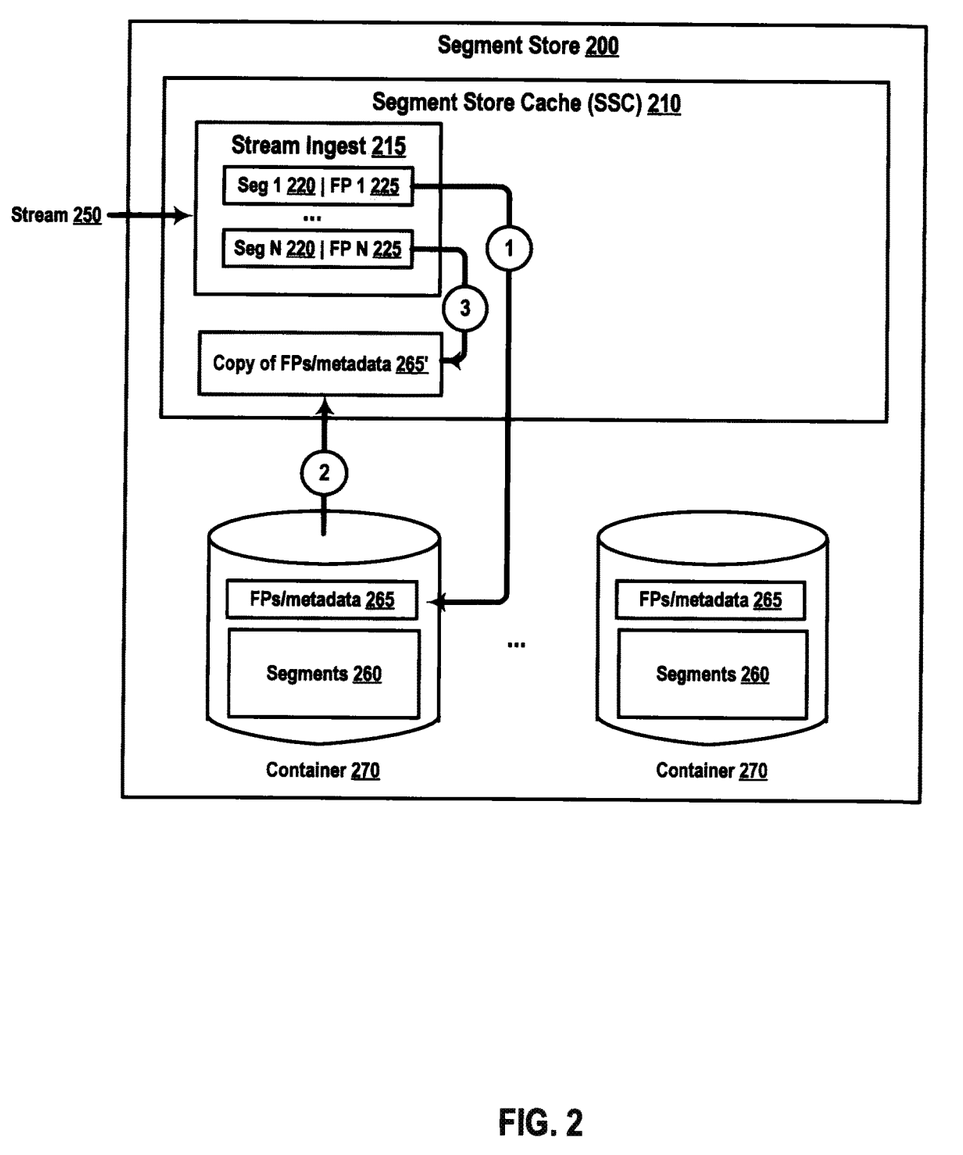
FIG. 2 illustrates, in block diagram form, a detailed view of a segment storage that can dynamically adjust parameters to reduce memory usage and reduce I/O's when deduplicating a stream of data, in accordance with some embodiments.

FIG. 2 illustrates, in block diagram form, a detailed view of a segment storage 200 that can dynamically adjust parameters to reduce memory usage and reduce I/O's when deduplicating a stream of data, in accordance with some embodiments.

A segment storage (or "segment store") 200 can include a segment store cache (SSC) 210, and one or more containers 270 of storage. Segment store cache 210 can contain memory allocated to a stream ingest buffer 215. Stream ingest 215 can also include logic to segment ingested stream 250, into one or more segments 220, each having a fingerprint 225 that identifies the content of the segment 220. A fingerprint can be a hash of the contents of the segment, such as SHA-1, SHA-128, or SHA-256.

Container(s) 270 can each be a portion of storage, such as a 4.5 megabyte (MB) stripe of a disk. A container 270 can include a fingerprint index and metadata 265 portion, and a segment data portion 260. Stream ingest 215 logic can (1) look up, in a container fingerprint index 265, a fingerprint 225 of a first segment 220 of ingested stream data 250. Stream ingest 215 logic can then read the fingerprint index 265 and container metadata into the segment storage cache 210. The copy of the fingerprint index 265' for the container can be (2) stored in segment store cache 210. Since streams are written to storage one container at a time, on generation 1 backups, and higher, most of the fingerprints 225 corresponding to ingested segments 220 can be (3) looked up in the copy of the fingerprint index 265', thereby saving a read I/O to the fingerprint index 265 of the container 270.

Figure 3:
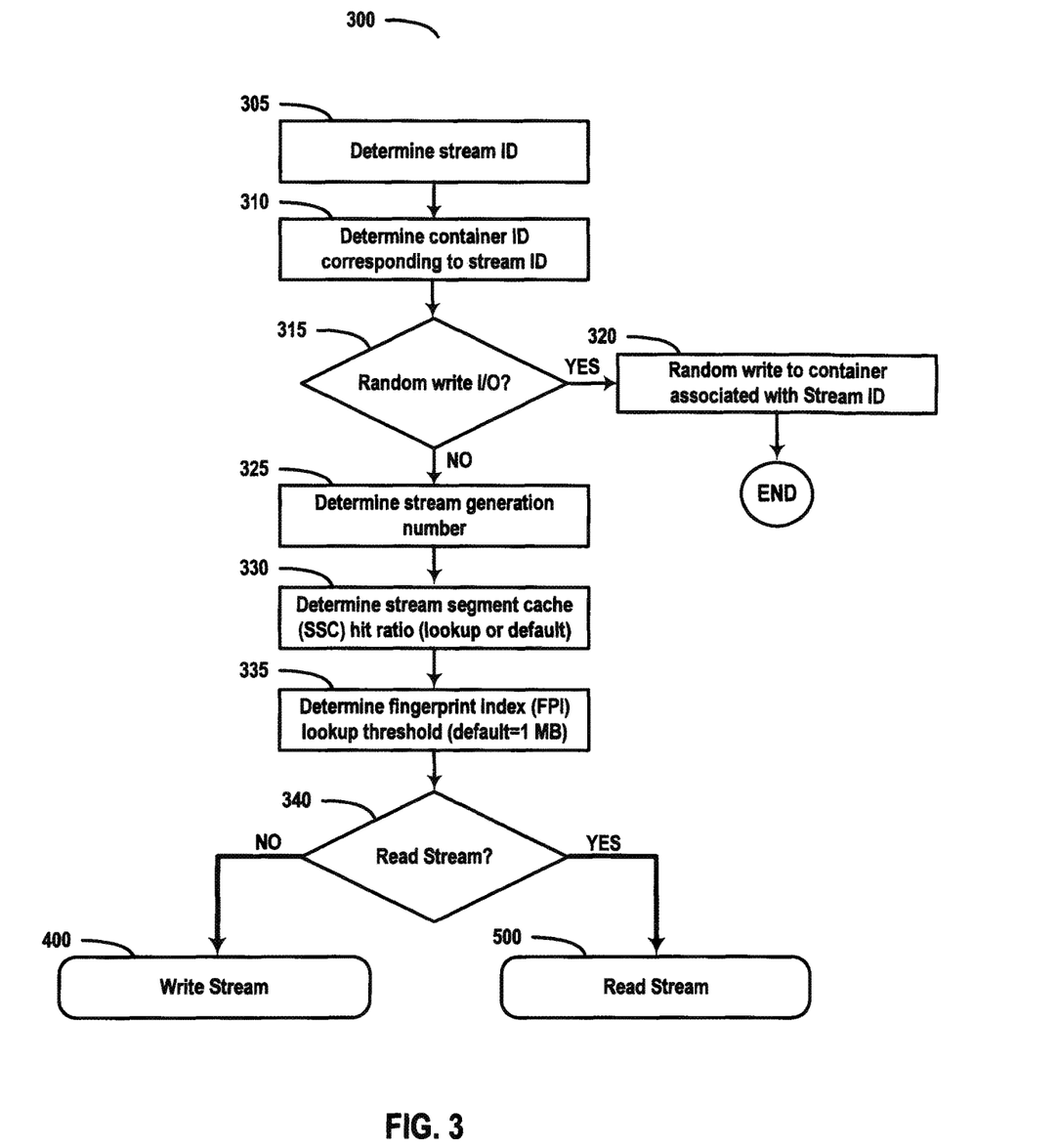
FIG. 3 illustrates, in block diagram form, an overview of a method to efficiently read and write stream data in a deduplication system, in accordance with some embodiments.

FIG. 3 illustrates, in block diagram form, an overview of a method 300 to efficiently read and write stream data in a data deduplication system, in accordance with some embodiments.

In operation 305, stream ingest logic 215 can determine a stream identifier (stream ID) for the stream 250 being read from, or written to, segment storage 200. A namespace index (not shown) in a storage device, such as target storage 140, can look up a stream ID for the stream 250 from metadata stored in the namespace index (not shown), or an associated content store (not shown).

In operation 310, additional metadata associated with the stream ID can indicate a first container 270 to read from, or write to, for the stream and a container identifier (container ID) for the container 270.

In operation 315, it can be determined whether the stream 250 initiates a random write to a container 270. An algorithm in ingest logic 215 can monitor read/write patterns in I/O's related to a stream, and determine whether or not an I/O is a random I/O or a stream I/O. A suitable algorithm is described in U.S. patent application Ser. No. 15/499,364 filed Apr. 27, 2017 to Yamini Allu, entitled "IO patterns and Prefetch," Attorney Docket No. 20721.24, EMC Corporation docket number EMC-16-1069, which is hereby incorporated by reference to the extent that it is consistent with this disclosure. If the I/O is a random write I/O then method 300 continues at operation 320, otherwise method 300 continues at operation 325.

In operation 320, stream ingest logic 215 can write the random I/O to the container having the container ID determined in operation 310, and method 300 ends.

In operation 325, stream ingest logic 215 can determine the generation number of the stream being read or written. The stream generation number can be stored in metadata associated with the stream 250 having the stream ID, in a namespace (not shown) for the streams on the target storage 140. The generation number can represent how many times, if any, that a stream has been written to a segment store 200. When a stream 250 is first written to segment store 200, its generation is 0. A second time that a stream 250 is written to the segment store, stream ingest logic 215 will attempt to write the stream 250 to the same containers as for generation 0, thereby generating substantial opportunity for data deduplication.

In operation 330, stream ingest logic 215 a segment store cache (SSC) hit ratio for a previous generation of the stream 250. If the stream is being written as generation 0, then a default SSC hit ratio is used. The SSC hit ratio represents the number of times that a segment fingerprint was found ("cache hit") in the copy of the fingerprint index 265' that was read into segment store cache 210 from container 270, divided by the number of times that a fingerprint was looked up in the copy of the fingerprint cache 265'. The SSC hit ratio is used to determine a fingerprint index lookup threshold data amount in operation 335. A default value SSC hit ratio can be 10%, and can be used in operation 335, below, to determine an initiate fingerprint index (FPI) lookup value, which is initially 1 MB by default.

In operation 335, stream ingest logic 215 can determined a fingerprint index (FPI) lookup threshold value. A default value can be 1 megabyte (1 MB). The FPI lookup threshold value is an amount of stream data that will be read from the stream 250, after a fingerprint has been looked up in a container fingerprint index 265 and read into memory as copy of fingerprint index 265'. The FPI lookup threshold value determines how frequently, or infrequently, a read I/O is issued to a container 270 to look up a fingerprint in the fingerprint index 265 of the container 270. When a read is issued to lookup a fingerprint in the container fingerprint index 265, the fingerprint index 265 is read into segment store cache 210 so that future fingerprint lookups are performed in the SSC 210 from copy of fingerprint index 265'. An example relationship between the SSC hit ratio and the FPI lookup threshold is shown in Table I below.

TABLE I

| Stream SSC Hit Ratio | Stream Index Lookup Threshold |
| --- | --- |
| 8% < ratio ≤ 100% | 1 MB |
| 4% < ratio ≤ 8% | 2 MB |
| 2% < ratio ≤ 4% | 4 MB |
| 1 < ratio ≤ 2% | 8 MB |
| 0 < ratio ≤ 1% | cache only deduplication |

In operation 340, it can be determined whether the stream I/O is a stream read I/O operation. If so, then method 300 continues at operation 500, otherwise method 300 continues at operation 400. Operation 400 is described in detail, below, with reference to FIGS. 4A and 4B. Operation 500 is described in detail, below, with reference to FIG. 5.

Figure 4A:
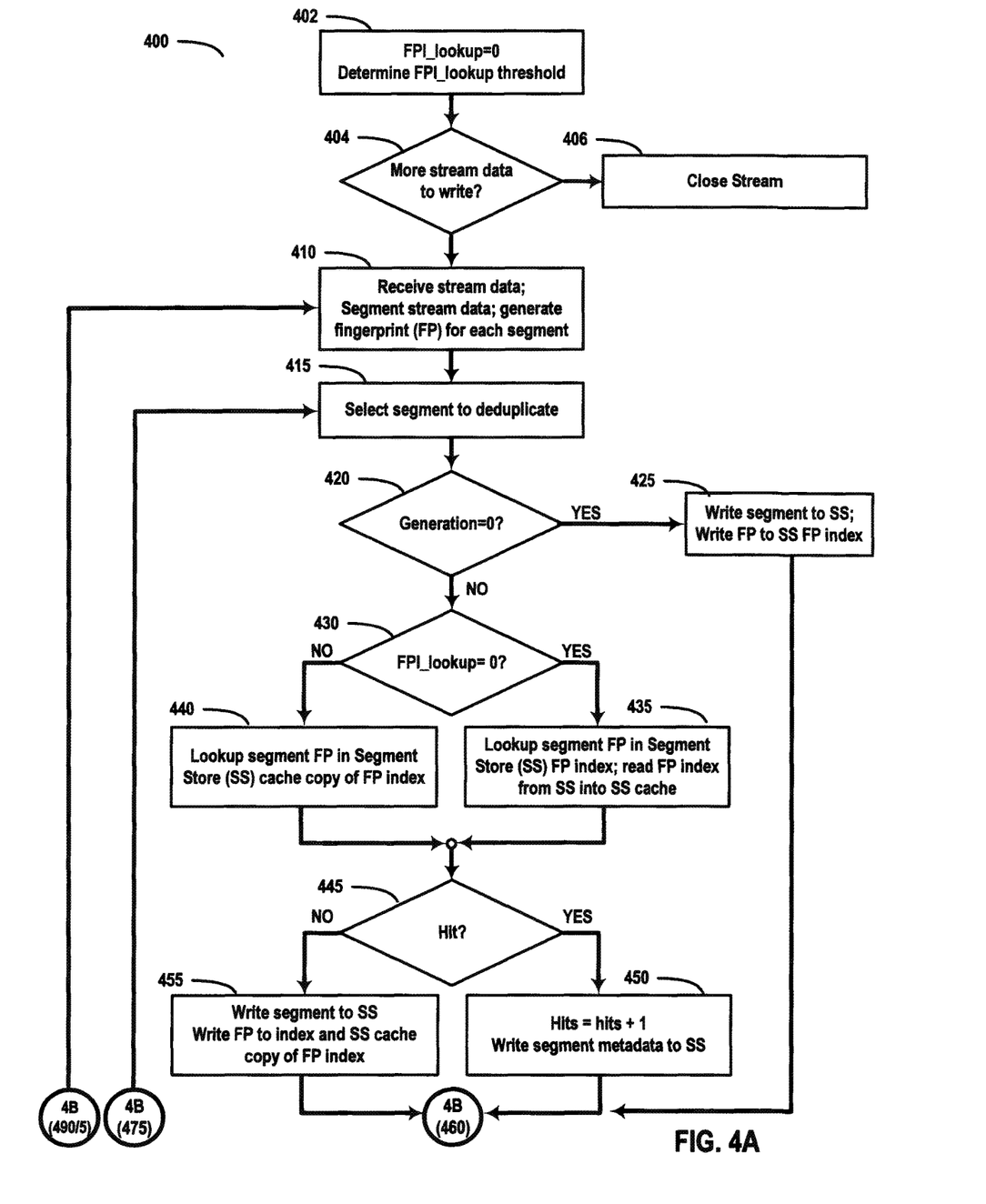
FIGS. 4A and 4B illustrate, in block diagram form, a method of writing a stream of data during backup in a deduplication system that reduces memory usage and reduces I/Os, in accordance with some embodiments.
Figure 4B:
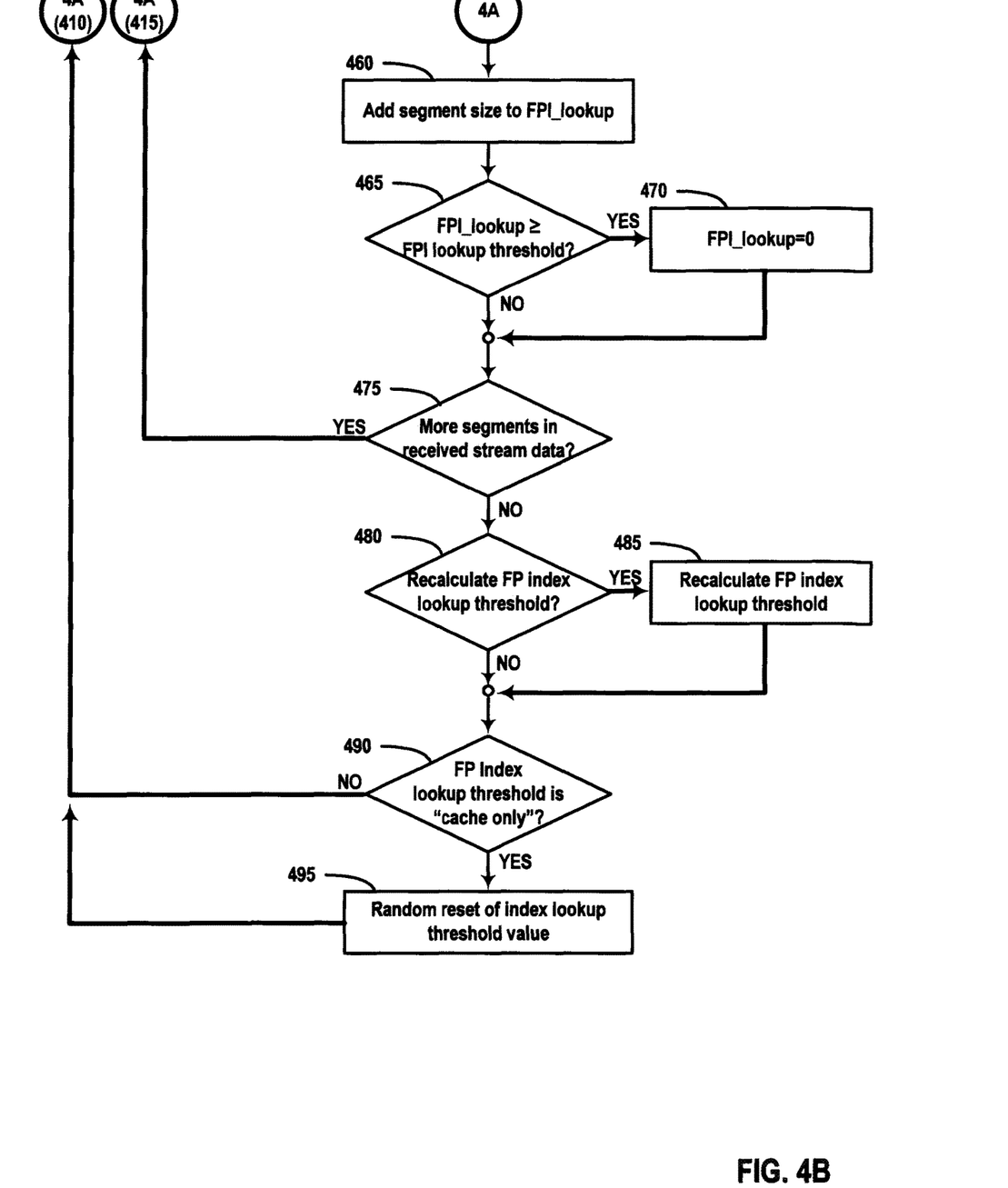

FIGS. 4A and 4B illustrate, in block diagram form, a method 400 of writing a stream 250 of data during backup in a deduplication system that reduces memory usage and reduces I/Os, in accordance with some embodiments.

In operation 402, a variable, FPI_Lookup, is initialized to 0. The variable FPI_lookup keeps a running total of the amount of data that has been ingested from stream 250 since the last time that the fingerprint index was read from disk and loaded into cache. In FIG. 3, operation 335, FPI_lookup_threshold was initially determined by looking up the last FPI_lookup_threshold from the previous generation of the stream 250.

In operation 404, it can be determined whether there is more stream data to write. If so, then method 400 continues at operation 410, otherwise method 400 continues at operation 406.

In operation 406, stream 250 can be closed. In an embodiment, metadata describing attributes of the generation of data written for the stream can be stored in association with the stream. Attributes of a generation of data written for the steam can include the last fingerprint index lookup hit ratio, the last fingerprint index lookup threshold value, and whether or not a fingerprint index lookup threshold value was randomly reset to a default value, e.g. 1 MB, to rebalance the dynamic tuning of the fingerprint index lookup threshold.

In operation 410, stream 250 data can be received from the stream. The received stream data is divided into segments of approximately 8 KB each. Segments can vary in length. For each segment of received data, a fingerprint of the segment can be generated from the content of the segment. A fingerprint can be generated using an algorithm such as SHA-1, SHA-128, or SHA-256. The fingerprint of each segment serves to identify the content in the segment. During deduplication of the stream data being written to storage, the fingerprint of a segment is looked up in a fingerprint index for a container of storage associated with the stream 250, to determine whether the segment has been previously stored in the container.

In operation 415, a first segment can be selected for deduplication.

In operation 420, it can be determined whether the stream 250 being written is generation 0, meaning that this is the first time that the stream 250 data has been written to storage. If so, then method 400 continues at operation 425, otherwise method 400 continues at operation 430. A generation 0 stream write will have little, or no, deduplication because the segments of data have not been previously stored, and thus fingerprint lookups will mostly fail. Thus, the overhead in memory and fingerprint index lookups (disk I/Os) for a generation 0 stream write would be a poor use of memory and disk I/Os.

In operation 425, the segment can be written to a container. The fingerprint corresponding to the segment can be written to a fingerprint index in the container. Method 400 continues at operation 460, described below with reference to FIG. 4B.

In operation 430, it can be determined whether the fingerprint index lookup variable, FPI_lookup, has been set, or reset, to 0. FPI_lookup tracks a number of bytes of data that have been written since the last fingerprint index lookup from disk. When FPI_lookup is set, or reset to 0, then method 400 continues at operation 435, otherwise method 400 continues at operation 440.

In operation 435, since FPI_lookup has been set, or reset to 0, the fingerprint corresponding to the segment selected in operation 415 is looked up in the fingerprint index, from disk, stored in the container. The fingerprint index is also read from the container on disk and stored in segment store (SS) cache 210. Method 400 continues at operation 445.

In operation 440, since FPI_lookup is not 0, the fingerprint index for the container has already been read from the container, and the fingerprint corresponding to the segment selected in operation 415 can be looked up in the copy of the fingerprint index 265' stored in SS cache 210. Method 400 continues at operation 445.

In operation 445, it can be determined whether the fingerprint for the segment has been found in the fingerprint index. The fingerprint index, here, refers to either the fingerprint index 265 on disk, from operation 435, or the copy of the fingerprint index 265' stored in SS cache from operation 440. If the fingerprint is found in the fingerprint index, then method 400 continues at operation 450, otherwise method 400 continues at operation 455.

In operation 450, the segment fingerprint has been found in the fingerprint index, meaning that the segment has been previously written to the container. Thus, to account for this segment in stream 250 backup, a reference to the stored segment is written to a segment store container, rather than writing the segment itself. In an embodiment, a segment tree will be updated with the fingerprint so that multiple files, or segment trees, can refer to the same fingerprint and segment. Method 400 continues at operation 460, described below with reference to FIG. 4B.

In operation 455, the fingerprint was not found in the fingerprint index, thus the segment has not been previously written to a container 270 of the segment store 200. The segment is written to a container 270, the fingerprint is written to the fingerprint index 265 of the container 270, and the fingerprint is inserted into the copy of the fingerprint index 265' in SS cache. Method 400 continues at operation 460, described below with reference to FIG. 4B.

In FIG. 4B, operation 460, the size of the segment processed can be added to variable FPI_lookup. FPI_lookup tracks the amount of data ingested from the stream 250 since the last time that FPI_lookup was set, or reset, to 0. The size of the segment processed is added to FPI_lookup regardless of whether the segment was written to a container or whether a reference to the segment was written to a container 270.

In operation 465, it can be determined whether FPI_lookup is greater than, or equal to, the FPI_lookup_threshold value. The FPI_lookup_threshold value indicates an amount of stream data ingested before resetting FPI_lookup to 0, thereby triggering a read of the fingerprint index from disk and into SS cache. If FPI_lookup is greater than or equal to FPI_lookup_threshold, then method 400 continues at operation 470, otherwise method 400 continues at operation 475.

In operation 470, FPI_lookup can be reset to 0.

In operation 475, it can be determined whether there are more segments that have been received, waiting to be processed. If so, then method 400 continues at operation 415, described above with reference to FIG. 4A. Otherwise, method 400 continues at operation 480.

In operation 480, it can be determined whether the fingerprint index lookup threshold value should be recalculated. In an embodiment, the fingerprint index lookup threshold value can be recalculated for each 100 MB of stream data that has been processed. If so, then method 400 continues at operation 485. Otherwise method 400 continues at operation 490.

In operation 485, the fingerprint index lookup threshold is recalculated. The fingerprint index lookup threshold can be determined from the segment store cache hit ratio, as described above in Table I and FIG. 3. Method 400 continues at operation 490.

In operation 490, it can be determined whether the fingerprint index lookup threshold as been set to "cache only" lookup. If so, then method 400 continues at operation 495. Otherwise method 400 continues at operation 410, described above with reference to FIG. 4A.

In operation 495, the fingerprint index lookup threshold can be randomly reset. In an embodiment, the fingerprint index lookup threshold is randomly reset to 1 MB by default. In an embodiment, the fingerprint index lookup threshold can be randomly reset to a value between 1 MB and 8 MB.

Figure 5:
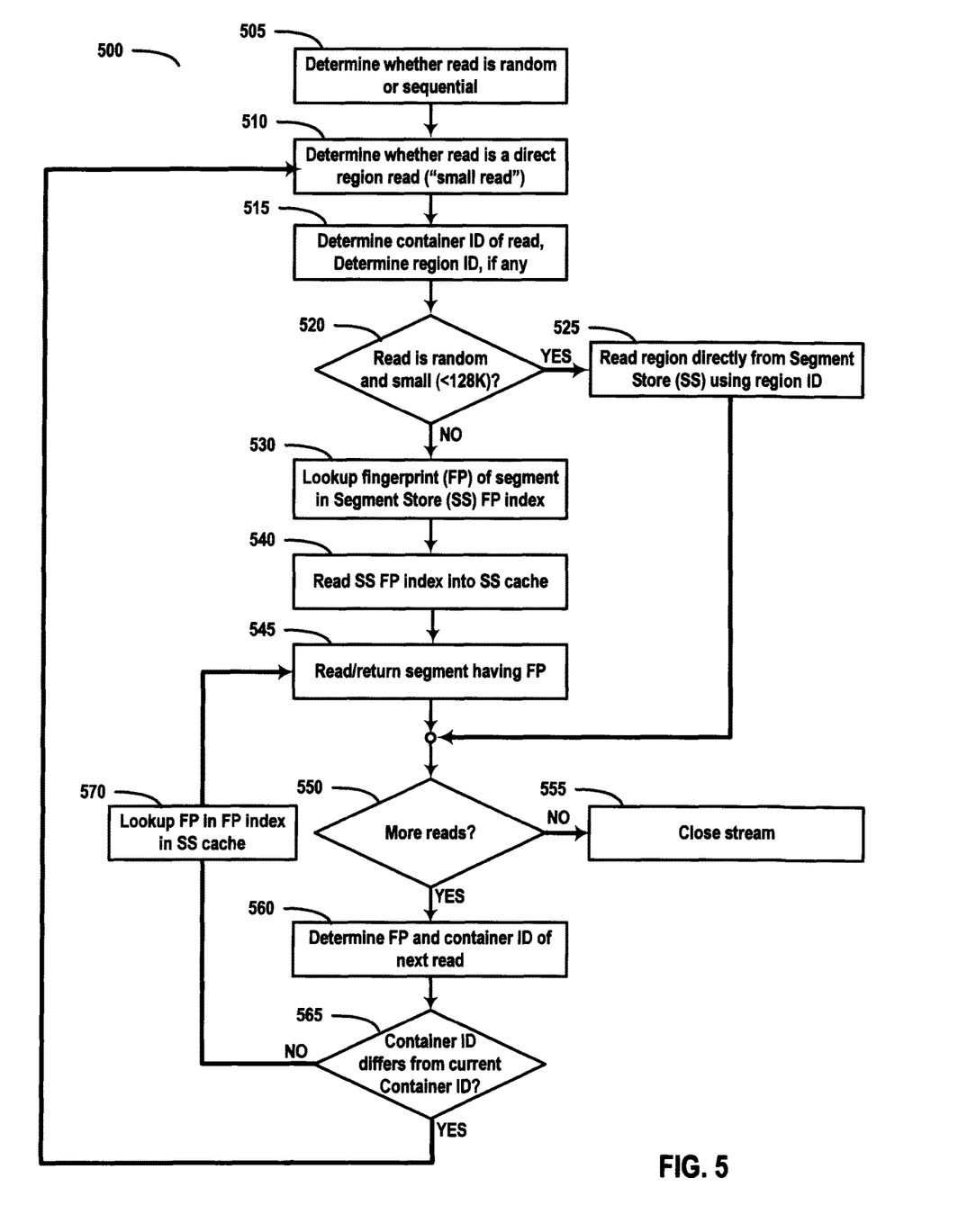
FIG. 5 illustrates, in block diagram form, a method of reading a stream of data that has been deduplicated in a deduplication system that reduces memory usage and reduces I/Os, in accordance with some embodiments.

FIG. 5 illustrates, in block diagram form, a method 500 of reading a stream of data that has been deduplicated in a deduplication system that reduces memory usage and reduces I/Os, in accordance with some embodiments.

In operation 505, in can be determined whether the stream read is random or sequential. An algorithm in ingest logic 215 can monitor read/write patterns in I/O's related to a stream, and determine whether or not an I/O is a random I/O or a stream I/O. A suitable algorithm is described in U.S. patent application Ser. No. 15/499364 filed Apr. 27, 2017 to Yamini Allu, entitled "IO patterns and Prefetch," Attorney Docket No. 20721.24, EMC Corporation docket number EMC-16-1069, which is hereby incorporated by reference to the extent that it is consistent with this disclosure.

In operation 510, it can be determined whether the read is a direct region read from a container. A region is a compressed portion of a container that can be 64 KB in size. When a region is written, an entry can be made in a namespace index for the stream indicating a region identifier (region ID) for the container in which the region is stored.

In operation 515, the container identifier (container ID) of the data to be read can be determined. If the read is a direct region read from a container, then the region ID in the container can be determined from metadata read from the container.

In operation 520, it can be determined whether the read is a small random read, such as a region read, less than 128 KB in size. If so, then method 500 continues at operation 525, otherwise method 500 continues at operation 530.

In operation 525, the region can be read directly from the segment store 200 container 270 using the region ID. Method 500 continues at operation 550.

In operation 530, the read is not random and small, the fingerprint for the segment to be read can be looked up in the fingerprint index of a container associated with the stream.

In operation 540, the fingerprint index 265' of the container 270 can be read into segment store cache 210. Subsequent stream reads can look up a fingerprint in the copy of the fingerprint index 265', thereby saving on fingerprint index lookups to disk.

In operation 545, the segment can be read from the container using the fingerprint index entry looked up in operation 530 above. The segment can be returned to a calling reader process that requested the read.

In operation 550, it can be determined whether there are more read operations to process. If so, then method 500 continues at operation 560, otherwise method 500 continues at operation 555.

In operation 555, the stream can be closed and any cache space used to store a copy of a container fingerprint index 265' can be released.

In operation 560, the fingerprint of the next segment to read and the container identifier for the next read operation can be determined. Fingerprints for stored segments can be stored as metadata in a content storage that describes a stream, accessible by a namespace index that refers to the stream, in a storage system.

In operation 565, if the container identifier associated with the next segment or region of the stream to be read differs from the current container identifier, then method 500 continues at operation 510, otherwise method 500 continues at operation 570.

In operation 570, the fingerprint of the next segment to be read can be read from the copy of the fingerprint cache 265' stored in the segment store cache 210. Method 500 continues at operation 545, above.

Figure 6:
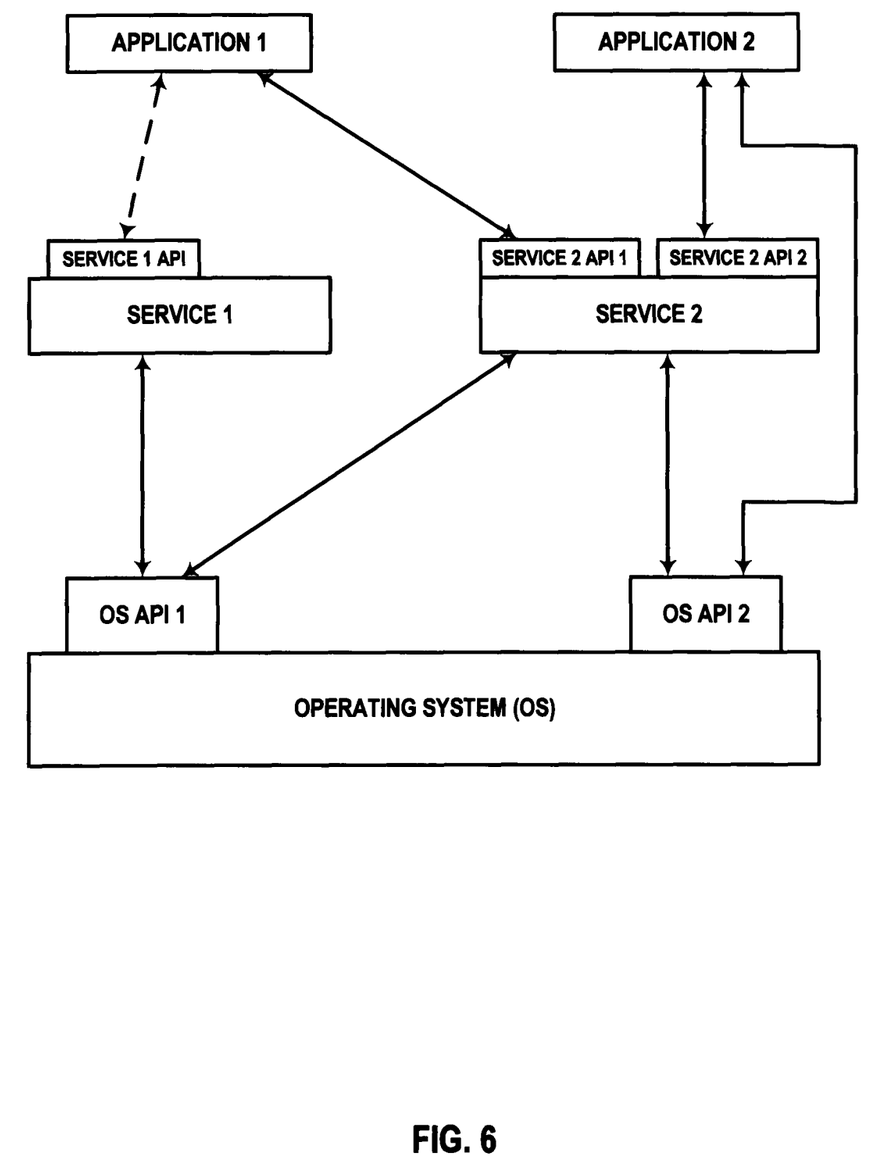
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
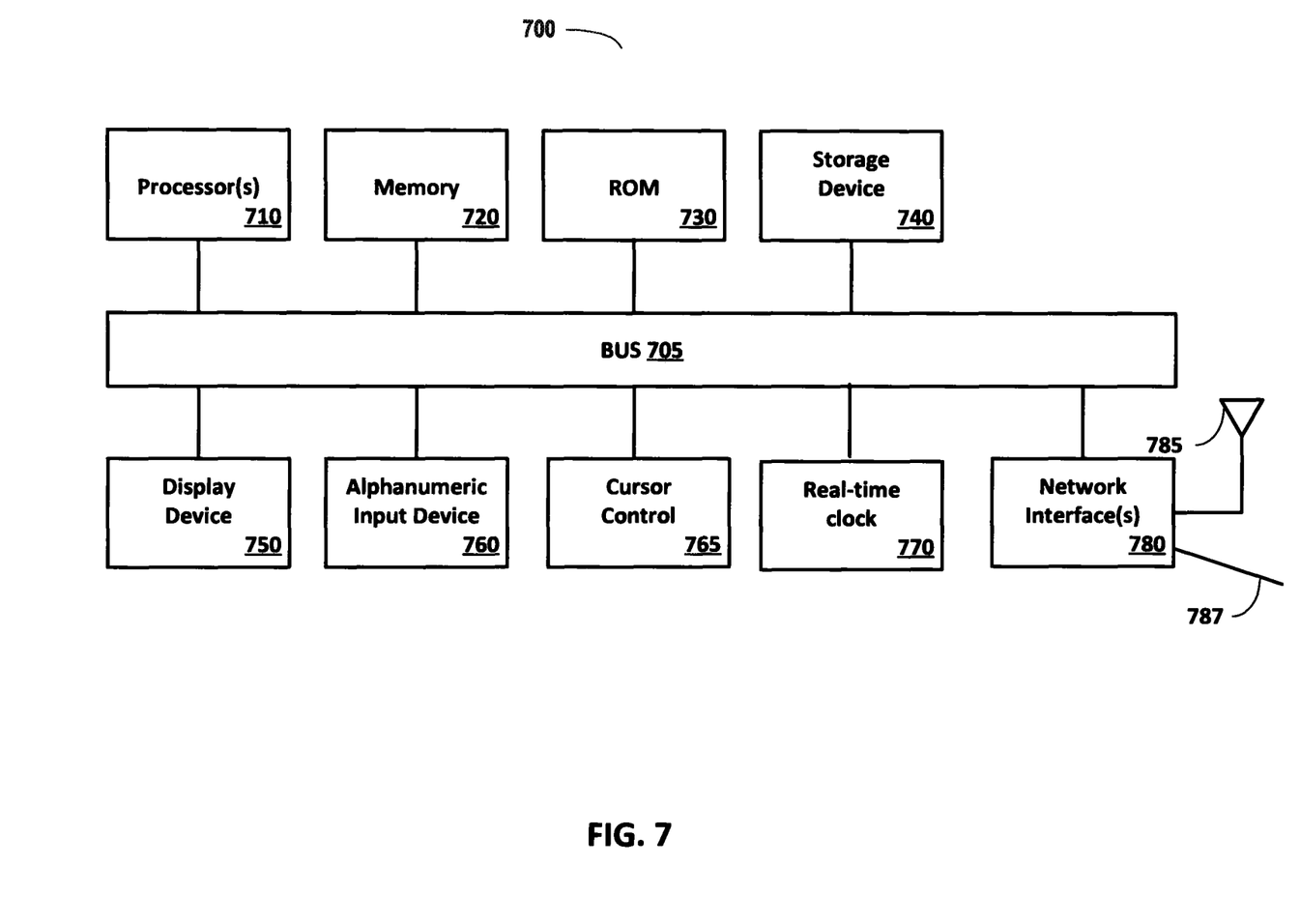
FIG. 7 illustrates, in block diagram form, an exemplary computing system for implementing concepts described herein.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), liquid crystal display (LCD), or touch screen display to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
   determining that a previous generation of stream of data has been deduplicated and written to a storage device as a plurality of segments of data, each segment having a fingerprint;
   determining a hit ratio of fingerprint lookups in a fingerprint index cache of the segment storage device, over at least a subset of the plurality of segments of data of the previous generation of the stream of data;
   for a subsequent generation of the stream of data being written to the storage device, determining a first fingerprint index lookup threshold that specifies a first amount of data that will be read from the subsequent stream, after which a fingerprint index lookup to the segment storage device will be performed, the index lookup threshold based at least in part on the hit ratio of the segment fingerprint lookups in the fingerprint index cache of the previous generation of the stream.

2. The method of claim 1, further comprising:
   in response to determining that the hit ratio of fingerprint lookups in the fingerprint index cache of the segment storage device for the previous generation of the stream is greater than 8%, setting the fingerprint index lookup threshold to 1 megabyte (1 MB) for deduplicating the subsequent generation of the stream of data.

3. The method claim 1, further comprising:
   receiving data from the subsequent generation of the stream of data;
   segmenting the received data into a plurality of segments, and generating a fingerprint for each segment in the plurality of segments;
   looking up the fingerprint of the first segment in a fingerprint index on a segment storage device, thereby reading a plurality of fingerprints from the segment storage device into a cached copy of the fingerprint index;
   wherein presence of a fingerprint in the fingerprint index indicates that the segment corresponding to the fingerprint has been previously stored on the segment storage device.

4. The method of claim 3, further comprising:
   looking up the fingerprint of the second, and subsequent, segments in the plurality of segments, in the cached copy of the fingerprint index;
   wherein presence of a fingerprint in the fingerprint index indicates that the segment corresponding to the fingerprint has been previously stored on the segment storage device.

5. The method of claim 4, further comprising:
   in response to determining that the fingerprint is present in the fingerprint index or in the segment storage cache:
      writing a reference to the segment having the fingerprint, to the segment storage device;
      increasing a count of fingerprint lookup hits;
   otherwise:
      writing the segment corresponding to the fingerprint to the segment storage device;
      writing the fingerprint, and a reference to the segment, to the fingerprint index; and
      inserting the fingerprint, and reference to the segment, into the cached copy of the fingerprint index.

6. The method of claim 1, further comprising, after deduplicating a threshold amount of received data for the subsequent generation of the stream:
- computing a fingerprint cache hit ratio, as a ratio of cache hits to cache lookups;
- determining a second fingerprint lookup index threshold that specifies a second amount of data that will be read from the subsequent stream, after which a fingerprint index lookup will be performed, the second fingerprint lookup index based at least in part on the hit ratio of the segment fingerprint lookups in the index cache of the subsequent stream, over the first amount of data.

7. The method of claim 1, further comprising, in response to determining that a write to storage is not a sequential stream write:
- writing the segment to a storage container associated with a stream identifier of the stream of data;
- writing the segment fingerprint to a fingerprint index in the storage container associated with the stream identifier of the stream of data.

8. The method of claim 1, wherein the previous generation of the stream of data was the first generation of the stream of data, and the previous generation of the stream of data was written to segment storage fingerprint without deduplication.

9. A non-transitory computer-readable medium programmed with executable instructions that, when executed by a processing system having at least one hardware processor, perform operations comprising:
- determining that a previous generation of stream of data has been deduplicated and written to a storage device as a plurality of segments of data, each segment having a fingerprint;
- determining a hit ratio of fingerprint lookups in a fingerprint index cache of the segment storage device, over at least a subset of the plurality of segments of data of the previous generation of the stream of data;
- for a subsequent generation of the stream of data being written to the storage device, determining a first fingerprint index lookup threshold that specifies a first amount of data that will be read from the subsequent stream, after which a fingerprint index lookup to the segment storage device will be performed, the index lookup threshold based at least in part on the hit ratio of the segment fingerprint lookups in the fingerprint index cache of the previous generation of the stream.

10. The medium of claim 9, further comprising:
- in response to determining that the hit ratio of fingerprint lookups in the fingerprint index cache of the segment storage device for the previous generation of the stream is greater than 8%, setting the fingerprint index lookup threshold to 1 megabyte (1 MB) for deduplicating the subsequent generation of the stream of data.

11. The medium claim 9, further comprising:
- receiving data from the subsequent generation of the stream of data;
- segmenting the received data into a plurality of segments, and generating a fingerprint for each segment in the plurality of segments;
- looking up the fingerprint of the first segment in a fingerprint index on a segment storage device, thereby reading a plurality of fingerprints from the segment storage device into a cached copy of the fingerprint index;
- wherein presence of a fingerprint in the fingerprint index indicates that the segment corresponding to the fingerprint has been previously stored on the segment storage device.

12. The medium of claim 11, further comprising:
- looking up the fingerprint of the second, and subsequent, segments in the plurality of segments, in the cached copy of the fingerprint index;
- wherein presence of a fingerprint in the fingerprint index indicates that the segment corresponding to the fingerprint has been previously stored on the segment storage device.

13. The medium of claim 12, further comprising:
- in response to determining that the fingerprint is present in the fingerprint index or in the segment storage cache:
  - writing a reference to the segment having the fingerprint, to the segment storage device;
  - increasing a count of fingerprint lookup hits;
- otherwise:
  - writing the segment corresponding to the fingerprint to the segment storage device;
  - writing the fingerprint, and a reference to the segment, to the fingerprint index; and
  - inserting the fingerprint, and reference to the segment, into the cached copy of the fingerprint index.

14. The medium of claim 9, further comprising, after deduplicating a threshold amount of received data for the subsequent generation of the stream:
- computing a fingerprint cache hit ratio, as a ratio of cache hits to cache lookups;
- determining a second fingerprint lookup index threshold that specifies a second amount of data that will be read from the subsequent stream, after which a fingerprint index lookup will be performed, the second fingerprint lookup index based at least in part on the hit ratio of the segment fingerprint lookups in the index cache of the subsequent stream, over the first amount of data.

15. The medium of claim 9, further comprising, in response to determining a write to storage is not a sequential stream write:
- writing the segment to a storage container associated with a stream identifier of the stream of data;
- writing the segment fingerprint to a fingerprint index in the storage container associated with the stream identifier of the stream of data.

16. The medium of claim 9, wherein the previous generation of the stream of data was the first generation of the stream of data, and the previous generation of the stream of data was written to segment storage fingerprint without deduplication.

17. A system comprising:
- a processing system having at least one hardware processor, the processing system coupled to a memory programmed with executable instructions that, when executed by the processing system, perform operations comprising:
  - determining that a previous generation of stream of data has been deduplicated and written to a storage device as a plurality of segments of data, each segment having a fingerprint;
  - determining a hit ratio of fingerprint lookups in a fingerprint index cache of a the segment storage device, over at least a subset of the plurality of segments of data of the previous generation of the stream of data;
  - for a subsequent generation of the stream of data being written to the storage device, determining a first fingerprint index lookup threshold that specifies a first amount of data that will be read from the subsequent stream, after which a fingerprint index lookup to the segment storage device will be performed, the index lookup threshold based at least in part on the hit ratio of the segment fingerprint lookups in the fingerprint index cache of the previous generation of the stream.

18. The system of claim 17, further comprising:
in response to determining that the hit ratio of fingerprint lookups in the fingerprint index cache of the segment storage device for the previous generation of the stream is greater than 8%, setting the fingerprint index lookup threshold to 1 megabyte (1 MB) for deduplicating the subsequent generation of the stream of data.

19. The system claim 17, further comprising:
receiving data from the subsequent generation of the stream of data;
segmenting the received data into a plurality of segments, and generating a fingerprint for each segment in the plurality of segments;
looking up the fingerprint of the first segment in a fingerprint index on a segment storage device, thereby reading a plurality of fingerprints from the segment storage device into a cached copy of the fingerprint index;
wherein presence of a fingerprint in the fingerprint index indicates that the segment corresponding to the fingerprint has been previously stored on the segment storage device.

20. The system of claim 19, further comprising:
looking up the fingerprint of the second, and subsequent, segments in the plurality of segments, in the cached copy of the fingerprint index;
wherein presence of a fingerprint in the fingerprint index indicates that the segment corresponding to the fingerprint has been previously stored on the segment storage device.

21. The system of claim 20, further comprising:
in response to determining that the fingerprint is present in the fingerprint index or in the segment storage cache:
  writing a reference to the segment having the fingerprint, to the segment storage device;
  increasing a count of fingerprint lookup hits;
otherwise:
  writing the segment corresponding to the fingerprint to the segment storage device;
  writing the fingerprint, and a reference to the segment, to the fingerprint index; and
  inserting the fingerprint, and reference to the segment, into the cached copy of the fingerprint index.

22. The system of claim 17, further comprising, after deduplicating a threshold amount of received data for the subsequent generation of the stream:
computing a fingerprint cache hit ratio, as a ratio of cache hits to cache lookups;
determining a second fingerprint lookup index threshold that specifies a second amount of data that will be read from the subsequent stream, after which a fingerprint index lookup will be performed, the second fingerprint lookup index based at least in part on the hit ratio of the segment fingerprint lookups in the index cache of the subsequent stream, over the first amount of data.

23. The system of claim 17, further comprising, in response to determining a write to storage is not a sequential stream write:
writing the segment to a storage container associated with a stream identifier of the stream of data;
writing the segment fingerprint to a fingerprint index in the storage container associated with the stream identifier of the stream of data.

24. The system of claim 17, wherein the previous generation of the stream of data was the first generation of the stream of data, and the previous generation of the stream of data was written to segment storage fingerprint without deduplication.

* * * * *